(12) United States Patent
Nakagawa et al.

(10) Patent No.: US 9,701,192 B2
(45) Date of Patent: Jul. 11, 2017

(54) FUEL CELL VEHICLE

(71) Applicant: HONDA MOTOR CO., LTD., Minato-ku, Tokyo (JP)

(72) Inventors: Satoshi Nakagawa, Wako (JP); Manabu Tanaka, Wako (JP); Mitsunori Matsumoto, Wako (JP); Shuichiro Iwatsuki, Wako (JP); Momoka Horiuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/246,031

(22) Filed: Aug. 24, 2016

(65) Prior Publication Data

US 2017/0057339 A1    Mar. 2, 2017

(30) Foreign Application Priority Data

Aug. 27, 2015   (JP) .................................. 2015-168151

(51) Int. Cl.
| | |
|---|---|
| *B60K 13/04* | (2006.01) |
| *H01M 8/2475* | (2016.01) |
| *B60L 11/18* | (2006.01) |
| *H01M 8/24* | (2016.01) |
| *H01M 8/0662* | (2016.01) |

(52) U.S. Cl.
CPC .......... *B60K 13/04* (2013.01); *B60L 11/1883* (2013.01); *B60L 11/1896* (2013.01); *H01M 8/24* (2013.01); *H01M 8/2475* (2013.01); *H01M 8/0662* (2013.01); *H01M 2250/20* (2013.01)

(58) Field of Classification Search
CPC .............. B60L 11/1883; B60L 11/1888; B60L 11/1892; B60L 11/1896; B60K 13/04
See application file for complete search history.

(56) References Cited

U.S. PATENT DOCUMENTS

| | | | |
|---|---|---|---|
| 6,422,332 B1* | 7/2002 | Takata | .................... F02B 61/02 |
| | | | 123/41.01 |
| 2008/0196957 A1* | 8/2008 | Koike | ....................... B60K 1/04 |
| | | | 180/68.5 |
| 2011/0111273 A1* | 5/2011 | Okada | ................. H01M 2/1077 |
| | | | 429/88 |
| 2013/0295473 A1* | 11/2013 | Yoshida | ................... B60K 1/00 |
| | | | 429/414 |

(Continued)

FOREIGN PATENT DOCUMENTS

| | | |
|---|---|---|
| EP | 1408571 A2 | 4/2004 |
| FR | 2829295 A1 | 3/2003 |
| JP | 2004-040950 A | 2/2004 |

(Continued)

OTHER PUBLICATIONS

Extended Search Report dated Oct. 24, 2016 issued over the corresponding European Patent Application No. 16185646.3.

*Primary Examiner* — John Walters
*Assistant Examiner* — James Triggs
(74) *Attorney, Agent, or Firm* — Carrier Blackman & Associates, P.C.; William D. Blackman; Jingli Wang (57) ABSTRACT

In a fuel cell vehicle, a stack case containing a fuel cell stack is mounted in a front box. Exhaust ducts are connected to openings formed in an upper panel of the stack case. A right exhaust duct connected to the exhaust ducts is opened to a right fender part, and a left exhaust duct connected to the exhaust ducts is opened to a left fender part.

17 Claims, 6 Drawing Sheets

(56) References Cited

U.S. PATENT DOCUMENTS

2015/0270562 A1  9/2015  Naito et al.

FOREIGN PATENT DOCUMENTS

| JP | 2006-188170 A | 7/2006 |
|---|---|---|
| JP | 2009-018803 A | 1/2009 |
| JP | 2010126015 A | 6/2010 |
| JP | 2011-051379 A | 3/2011 |
| JP | 2014-136531 A | 7/2014 |
| JP | 2015-193370 A | 11/2015 |

* cited by examiner

FIG. 6 though at an upper position of the closed space, especially when the vehicle is stopped, the hydrogen leaked from the fuel cell system into the closed space can be driven out of the vehicle. Further, according to the disclosure, in the case where the opening is provided at the position where the negative pressure is generated, during traveling of the vehicle, the hydrogen leaked from the fuel cell system can be discharged from the closed space.

FUEL CELL VEHICLE

CROSS-REFERENCE TO RELATED APPLICATION

This application is based upon and claims the benefit of priority from Japanese Patent Application No. 2015-168151 filed on Aug. 27, 2015, the contents of which are incorporated herein by reference.

BACKGROUND OF THE INVENTION

Field of the Invention

The present invention relate to a fuel cell vehicle including a fuel cell stack comprising a plurality of fuel cells stacked, a stack case containing the fuel cell stack, and a vehicle body equipped with the stack case inside the vehicle body.

Description of the Related Art

For example, in a solid polymer electrolyte fuel cell, an electrolyte membrane (polymer ion exchange membrane) is interposed between an anode and a cathode to form a membrane electrode assembly (MEA). The membrane electrode assembly is sandwiched between a pair of separators to form a power generation cell. Generally, a fuel cell includes a predetermined number of power generation cells stacked together and is mounted, for example, as a vehicle fuel cell stack, in a fuel cell vehicle.

In respect of the fuel cell vehicle, there is a concern that a fuel gas, in particular, hydrogen, may leak into a space where the fuel cell stack is mounted. Therefore, in an attempt to discharge the hydrogen leaked from the fuel cell stack to the outside efficiently, for example, a fuel cell vehicle disclosed in Japanese Laid-Open Patent Publication No. 2004-040950 has been proposed.

In this fuel cell vehicle, a closed space is positioned in front of a passenger compartment, and the fuel cell is mounted in the closed space. Then, as necessary, a first opening is provided at an upper position of the closed space. A second opening is provided at a position where a negative pressure is generated during traveling of the vehicle. The hydrogen leaked from the fuel cell system is discharged into the closed space.

According to the disclosure, in the case where the opening is provided at the upper position of the closed space, especially when the vehicle is stopped, the hydrogen leaked from the fuel cell system into the closed space can be driven out of the vehicle. Further, according to the disclosure, in the case where the opening is provided at the position where the negative pressure is generated, during traveling of the vehicle, the hydrogen leaked from the fuel cell system can be discharged from the closed space.

SUMMARY OF THE INVENTION

In Japanese Laid-Open Patent Publication No. 2004-040950, the opening is provided at the upper position of the closed space. In the structure, when the vehicle is tilted to the front or back, or tilted to the left or right, the hydrogen may remain in the closed space undesirably. Therefore, there is a concern that the leaked hydrogen cannot be driven out of the vehicle reliably.

The present invention has been made to solve the problem of this type, and an object of the present invention is to provide a fuel cell vehicle in which it is possible with a simple structure to discharge a fuel gas leaked into a stack case to the outside of the vehicle easily and reliably.

A fuel cell vehicle according to the present invention includes a fuel cell stack comprising a plurality of fuel cells stacked for generating electrical energy by electrochemical reactions of a fuel gas and an oxygen-containing gas, a stack case containing the fuel cell stack, and a vehicle body equipped with the stack case in the vehicle body.

One end of a duct member is connected to the stack case, and the other end of the duct member is opened to a fender part of the vehicle body.

Further, preferably, the stack case is mounted in a front box formed in front of a dashboard, and an exhaust port opened to an upper position of the fender part of a front wheel is provided at the other end of the duct member.

Further, preferably, one end of the duct member is connected to an end of the stack case in a vehicle width direction, and in a plan view of the vehicle, each duct member is inclined to the outside in the vehicle width direction toward the backside in the traveling direction of the vehicle.

Moreover, preferably, an upper end position of the exhaust port is below a lower end position of at least part of an inner wall surface of the duct member.

Further, preferably, the opening area of the exhaust port is increased toward the backside in the traveling direction of the vehicle.

Further, preferably, a left duct member and a right duct member are coupled by a bypass duct.

Further, preferably, four duct members are connected to four corners of the stack case.

Further, preferably, two duct members on one side of the stack case in the vehicle width direction are merged and opened to an exhaust port provided on the upper position of the fender part.

Further, preferably, a mesh member is provided on the exhaust port.

According to the present invention, one end of the duct member is connected to the stack case, and the other end of the duct member is opened to the fender part of the vehicle body. Therefore, with the simple structure, it becomes possible to discharge the fuel gas leaked into the stack case to the outside of the vehicle easily and reliably.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
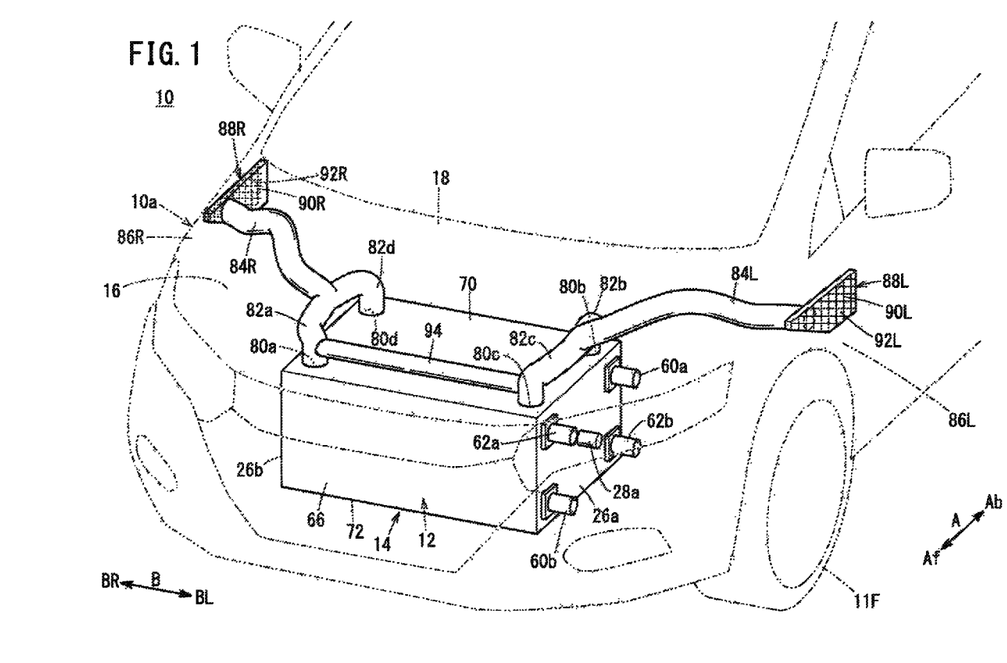
FIG. 1 is a perspective view schematically showing a front portion of a fuel cell vehicle according to an embodiment of the present invention.
Figure 2:
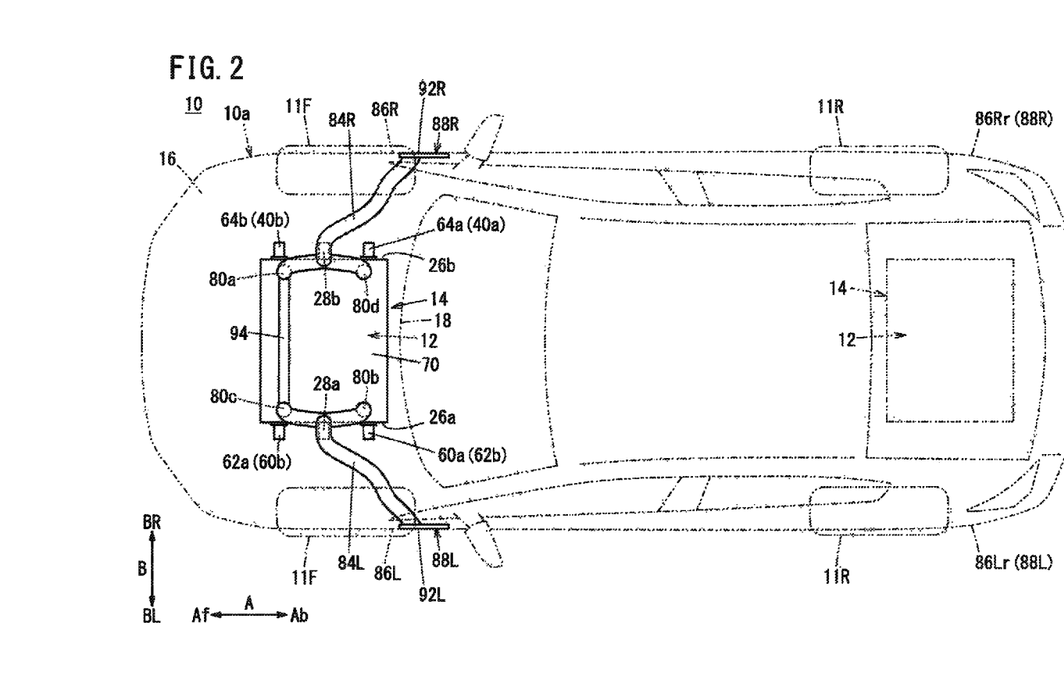
FIG. 2 is a plan view schematically showing the fuel cell vehicle.
Figure 3:
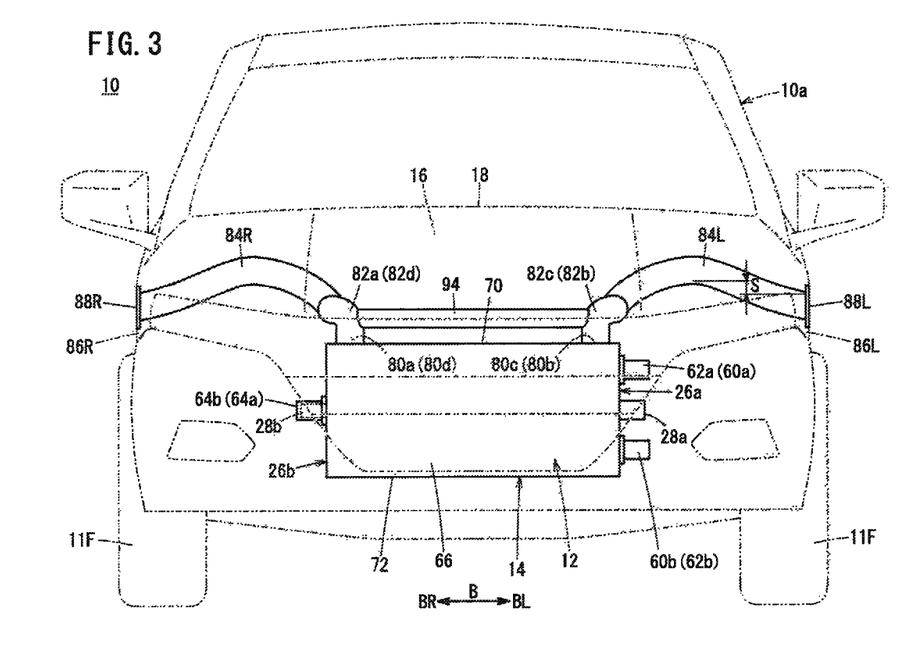
FIG. 3 is a front view schematically showing the fuel cell vehicle.

As shown in FIGS. 1 to 3, a fuel cell vehicle 10 according to an embodiment of the present invention is a fuel cell electric vehicle, for example. The fuel cell vehicle 10 includes a vehicle body 10a having front wheels 11F and rear wheels 11R (see FIG. 2). On the front wheel 11F side of the vehicle body 10a, a front box (motor room) 16 equipped with a stack case 14 is provided in front of a dashboard 18. The stack case 14 houses a fuel cell stack 12.

Figure 4:
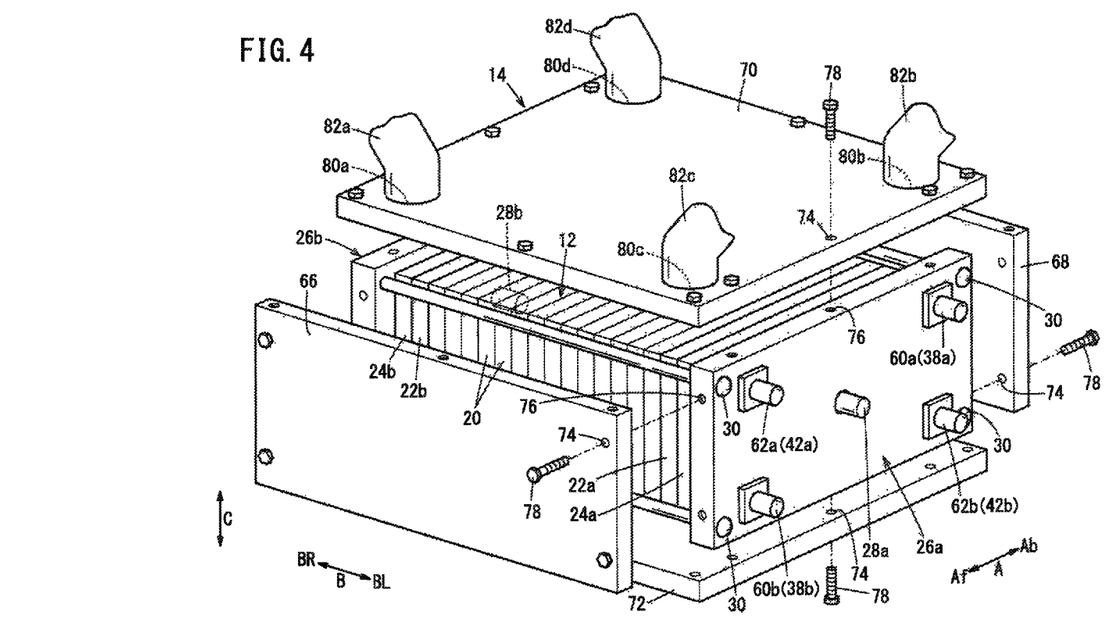
FIG. 4 is an exploded perspective view showing a stack case housing a fuel cell stack of the fuel cell vehicle.

As shown in FIG. 4, the fuel cell stack 12 is formed by stacking a plurality of fuel cells 20 in a vehicle width direction indicated by an arrow B. At one end of the fuel cells 20 in the stacking direction, a first terminal plate 22a is provided. Further, a first insulating plate 24a is provided outside the first terminal plate 22a, and a first end plate 26a is provided outside the first insulating plate 24a.

At the other end of the fuel cells 20 in the stacking direction, a second terminal plate 22b is provided. Further, a second insulating plate 24b is provided outside the second terminal plate 22b, and a second end plate 26b is provided outside the second insulating plate 24b. At both ends of the fuel cell stack 12 in the vehicle width direction, the first end plate 26a and the second end plate 26b are provided respectively.

The outer dimensions of the first end plate 26a and the outer dimension of the second end plate 26b are larger than the outer dimensions of the fuel cells 20, the first insulating plate 24a, and the second insulating plate 24b. The first terminal plate 22a may be placed in a recess inside the first insulating plate 24a, and the second terminal plate 22b may be placed in a recess inside the second insulating plate 24b.

A first power output terminal 28a extends outward from a central position of the laterally elongated first end plate 26a. The first power output terminal 28a is connected to the first terminal plate 22a. A second power output terminal 28b extends outward from a central position of the laterally elongated second end plate 26b. The second power output terminal 28b is connected to the second terminal plate 22b. Corners of the first end plate 26a and the second end plate 26b are fixed by tie rods 30 extending in the stacking direction, and a tightening load is applied to components between the first end plate 26a and the second end plate 26b.

Figure 5:
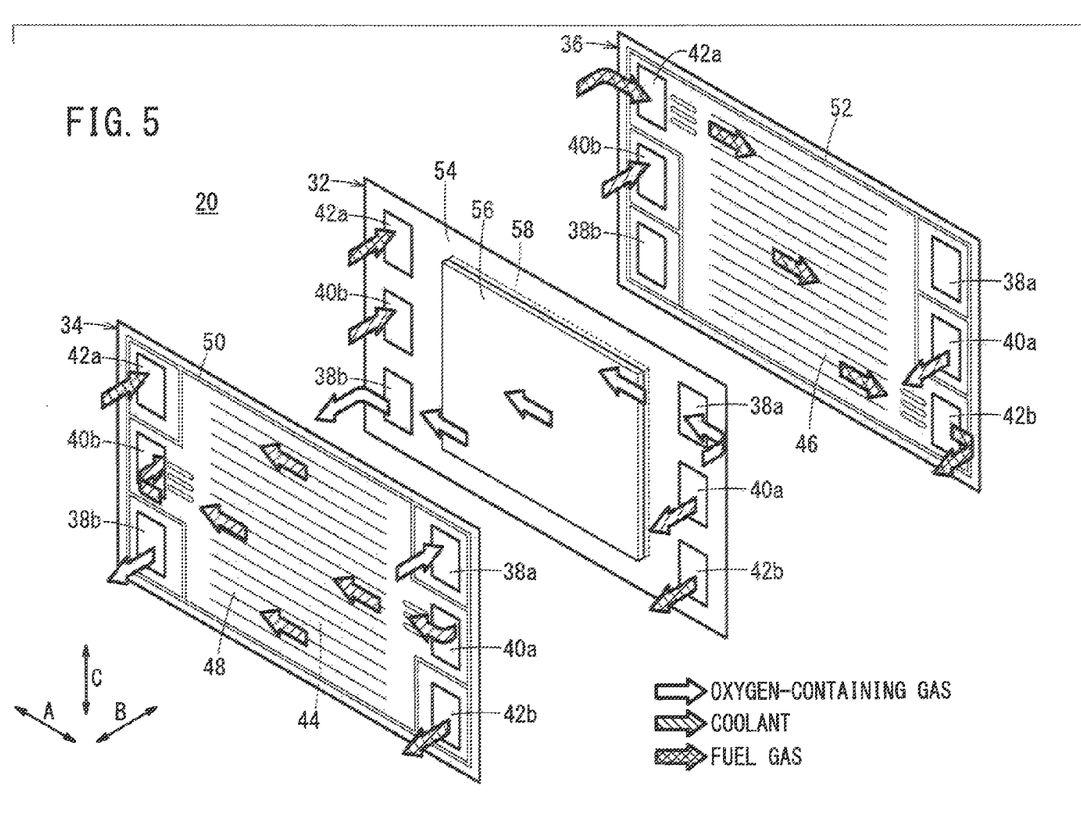
FIG. 5 is an exploded perspective view showing main components of a fuel cell of the fuel cell stack.

As shown in FIG. 5, the fuel cell 20 includes a membrane electrode assembly 32 and a first separator 34 and a second separator 36 sandwiching the membrane electrode assembly 32. The first separator 34 and the second separator 36 are metal separators or carbon separators.

At one end of the fuel cell 20 in the direction indicated by the arrow A, an oxygen-containing gas supply passage 38a, a coolant supply passage 40a, and a fuel gas discharge passage 42b are arranged in the vertical direction indicated by the arrow C. The oxygen-containing gas supply passage 38a, the coolant supply passage 40a, and the fuel gas discharge passage 42b extend through the fuel cells 20 in the stacking direction indicated by the arrow B. An oxygen-containing gas is supplied through the oxygen-containing gas supply passage 38a. A coolant is supplied through the coolant supply passage 40a. A fuel gas, for example hydrogen-containing gas, is discharged through the fuel gas discharge passage 42b.

At the other end of the fuel cells 20 in the direction indicated by the arrow A, a fuel gas supply passage 42a for supplying the fuel gas, a coolant discharge passage 40b for discharging the coolant, and an oxygen-containing gas discharge passage 38b for discharging the oxygen-containing gas are arranged in the direction indicated by the arrow C. The fuel gas supply passage 42a, the coolant discharge passage 40b, and the oxygen-containing gas discharge passage 38b extend through the fuel cells 20 in the direction indicated by the arrow B.

The first separator 34 has an oxygen-containing gas flow field 44 on a surface facing the membrane electrode assembly 32. The oxygen-containing gas flow field 44 is connected to the oxygen-containing gas supply passage 38a and the oxygen-containing gas discharge passage 38b. The second separator 36 has a fuel gas flow field 46 on a surface facing the membrane electrode assembly 32. The fuel gas flow field 46 is connected to the fuel gas supply passage 42a and the fuel gas discharge passage 42b.

A coolant flow field 48 is formed between the first separator 34 of one of the adjacent fuel cells 20 and the second separator 36 of the other of the adjacent fuel cells 20. The coolant flow field 48 is connected to the coolant supply passage 40a and the coolant discharge passage 40b. Seal members 50, 52 are formed integrally with the first separator 34 and the second separator 36, respectively. Alternatively, members separate from the first separator 34 and the second separator 36 may be provided as the seal members 50, 52 on the first separator 34 and the second separator 36.

The membrane electrode assembly 32 includes a cathode 56, an anode 58, and a solid polymer electrolyte membrane 54 interposed between the cathode 56 and the anode 58. The solid polymer electrolyte membrane 54 is formed by impregnating a thin membrane of perfluorosulfonic acid with water, for example. Each of the cathode 56 and the anode 58 has a gas diffusion layer such as carbon paper, and an electrode catalyst layer of platinum alloy supported on porous carbon particles. The carbon particles are deposited uniformly on the surface of the gas diffusion layer. The electrode catalyst layers of the cathode 56 and the anode 58 are formed on both surfaces of the solid polymer electrolyte membrane 54, respectively.

As shown in FIG. 4, an oxygen-containing gas supply manifold 60a and an oxygen-containing gas discharge manifold 60b are provided at one pair of diagonal positions of the first end plate 26a. The oxygen-containing gas supply manifold 60a is connected to the oxygen-containing gas supply passage 38a, and the oxygen-containing gas discharge manifold 60b is connected to the oxygen-containing gas discharge passage 38b. A fuel gas supply manifold 62a and a fuel gas discharge manifold 62b are provided at the other pair of diagonal positions of the first end plate 26a. The fuel gas supply manifold 62a is connected to the fuel gas supply passage 42a, and the fuel gas discharge manifold 62b is connected to the fuel gas discharge passage 42b.

As shown in FIG. 2, a coolant supply manifold 64a and a coolant discharge manifold 64b are provided at the second end plate 26b. The coolant supply manifold 64a is connected to the coolant supply passage 40a, and the coolant discharge manifold 64b is connected to the coolant discharge passage 40b.

As shown in FIG. 4, the fuel cell stack 12 is placed in the stack case 14 having a rectangular shape in a plan view. The stack case 14 includes a front side panel 66, a rear side panel 68, an upper panel 70, a lower panel 72, the first end plate 26a, and the second end plate 26b. Further, the components of the stack case 14 are fixed to the first end plate 26a and the second end plate 26b by screws 78 which are inserted into holes 74, and screwed into screw holes 76.

The inner surface of the upper panel 70 forming an upper surface of the stack case 14, i.e., a ceiling surface which faces the fuel cell stack 12 is a flat surface. Openings 80a, 80b letting the inside of the stack case 14 communicate with the outside are formed at one pair of diagonal positions of the upper panel 70, and openings 80c, 80d letting the inside of the stack case 14 communicate with the outside are formed at the other pair of diagonal positions of the upper panel 70.

The openings 80a, 80c are provided at both side positions of the front side of the stack case 14, the front side being defined in the direction indicated by an arrow Af, and are arranged vertically above the fuel gas supply passage 42a. The openings 80b, 80d are provided at both side portions of the backside of the stack case 14, the backside being defined in the direction indicated by an arrow Ab. That is, the openings 80a to 80d are formed at four corners of the stack case 14 (upper panel 70).

One end of each of exhaust ducts (duct members) 82a to 82d is connected to each of the corresponding openings 80a to 80d. Thus, the exhaust ducts 82a to 82d are connected to the four corners of the stack case 14 (upper panel 70). As shown in FIGS. 1 and 2, the other end of the exhaust duct 82a and the other end of the exhaust duct 82d are merged, and connected to one end of the right exhaust duct (duct member) 84R. The other end of the exhaust duct 82b and the other end of the exhaust duct 82c are merged, and connected to one end of the left exhaust duct (duct member) 84L. As described later, the right exhaust duct 84R and the left exhaust duct 84L have a height difference partially, and includes steps and curves. In order to reduce the height of the front box 16, the height difference is minimized.

As shown in FIG. 2, in a plan view of the vehicle, the right exhaust duct 84R and the left exhaust duct 84L are inclined outwards in the vehicle width direction (direction indicated by the arrow BR or the direction indicated by the arrow BL) pulled backward in the traveling (longitudinal) direction of the vehicle (direction indicated by the arrow Ab). The right exhaust duct 84R is opened to a right fender part 86R of the vehicle body 10a of the fuel cell vehicle 10, and the left exhaust duct 84L is opened to the left fender part 86L of the vehicle body 10a. Elastic hoses may be connected to the right exhaust duct 84R and the left exhaust gas duct 84L. Further, the right exhaust duct 84R and the left exhaust duct 84L may have a horizontally flat shape.

As shown in FIGS. 1 to 3, in the left fender part 86L and the right fender part 86R, a left exhaust gas member 88L and a right exhaust gas member 88R are provided respectively, above and behind (on the backside of) the front wheels 11F. Each of the left exhaust gas member 88L and the right exhaust gas member 88R has an internal space, and a mesh member 90L and a mesh member 90R are provided on the surfaces of the left exhaust gas member 88L and the right exhaust gas member 88R, respectively. The mesh members 90L and 90R form a left exhaust port 92L and a right exhaust port 92R, respectively. The left exhaust gas member 88L and the right exhaust gas member 88R may be plates having a plurality of holes with the mesh member 90L and the mesh member 90R for the external air flows through.

Figure 6:
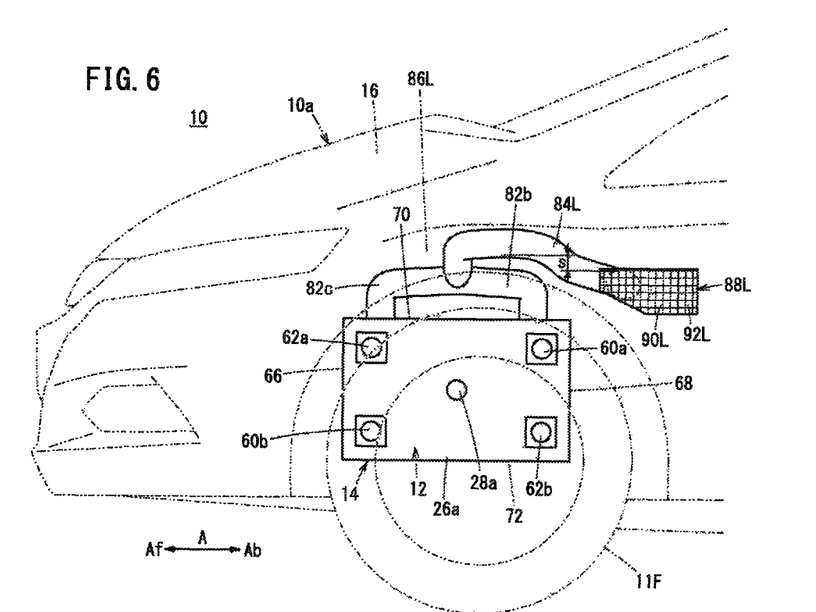
FIG. 6 is a left front view showing a front portion of the fuel cell vehicle.

As shown in FIG. 6, the opening area of the left exhaust port 92L is increased toward the backside in the traveling direction of the vehicle. In a front view, the front end portion of the left exhaust port 92L has a substantially triangular shape where the size of the opening in the vertical direction is reduced toward the front side, and the rear end of the left exhaust port 92L has a substantially quadrangular shape. Likewise, the opening area of the right exhaust port 92R is increased toward the backside in the traveling direction of the vehicle.

As shown in FIGS. 3 and 6, the upper end positions of the left exhaust port 92L and the right exhaust port 92R are spaced downward from the lower end positions of at least part of the inner wall surfaces of the left exhaust duct 84L and the right exhaust duct 84R by a dimension S(>0).

As shown in FIGS. 1 to 3, the exhaust duct 82a and the exhaust duct 82c are coupled by a bypass duct 94. Therefore, even if the fuel cell vehicle 10 is tilted, it is possible to achieve the uniform hydrogen concentration inside the stack case 14.

The fuel cell stack 12 is fixed to a vehicle frame through mount members (not shown) provided for the first end plate 26a and the second end plate 26b.

Operation of the fuel cell vehicle 10 having the above structure will be described below.

Firstly, during operation of the fuel cell vehicle 10, as shown in FIG. 4, a fuel gas is supplied from the fuel gas supply manifold 62a of the first end plate 26a to the fuel gas supply passage 42a. In the meanwhile, the oxygen-containing gas is supplied from the oxygen-containing gas supply manifold 60a of the first end plate 26a to the oxygen-containing gas supply passage 38a.

As shown in FIG. 5, the fuel gas flows from the fuel gas supply passage 42a to the fuel gas flow field 46 of the second separator 36. This hydrogen gas is supplied along the anode 58 of the membrane electrode assembly 32.

The oxygen-containing gas is supplied from the oxygen-containing gas supply passage 38a into the oxygen-containing gas flow field 44 of the first separator 34. The oxygen-containing gas flows along the cathode 56 of the membrane electrode assembly 32.

Thus, in the membrane electrode assembly 32, the hydrogen gas supplied to the anode 58 and the air supplied to the cathode 56 are consumed in the electrochemical reactions at catalyst layers of the electrodes for generating electricity.

As shown in FIG. 4, the fuel gas is discharged from the fuel gas discharge passage 42b to the fuel gas discharge manifold 62b of the first end plate 26a. The oxygen-containing gas is discharged from the oxygen-containing gas discharge passage 38b to the oxygen-containing gas discharge manifold 60b of the first end plate 26a.

Further, as shown in FIG. 2, the coolant is supplied from the coolant supply manifold 64a of the second end plate 26b to the coolant supply passage 40a. As shown in FIG. 5, the coolant flows into the coolant flow field 48 between the first separator 34 and the second separator 36. After the coolant cools the membrane electrode assembly 32, the coolant flows through the coolant discharge passage 40b, and the coolant is discharged into the coolant discharge manifold 64b.

In the embodiment of the present invention, as shown in FIG. 1, the upper panel 70 forms the upper surface of the stack case 14, and the openings 80a, 80b are formed at one pair of diagonal positions of the upper panel 70, and the openings 80c, 80d are formed at the other pair of diagonal positions of the upper panel 70. The one end of each of the exhaust ducts 82a to 82d is connected to each of the openings 80a to 80d. The other end of each of the exhaust ducts 82a and 82d is connected to one end of the right exhaust duct 84R, and the other end of each of the exhaust duct 82b and 82c is connected to one end of the left exhaust duct 84L.

Further, the right exhaust duct 84R is opened to the right fender part 86R of the vehicle body 10a of the fuel cell vehicle 10, and the left exhaust duct 84L is opened to the left fender part 86L of the vehicle body 10a.

In the structure, since the fuel gas leaked from the fuel cell stack 12, e.g., hydrogen, is lighter than the air, the hydrogen moves up in the stack case 14, and the hydrogen is discharged to the outside from each of the openings 80a to 80d.

Therefore, the fuel gas is not retained in the stack case 14. Thus, with the simple structure, the fuel gas leaked into the stack case 14 is discharged to the outside of the vehicle easily and reliably.

Further, conventionally, the right fender part 86R and the left fender part 86L are spaces which have not been used for any purpose. However, in the present invention, the right fender part 86R and the left fender part 86L can be used as exhaust ports. Thus, improvement in the space efficiency is achieved.

Further, the stack case 14 is mounted in the front box 16 formed in front of the dashboard 18. Further, the right exhaust port 92R and the left exhaust port 92L opened to the upper positions of the right fender part 86R and the left fender part 86L of the wheels 11F are provided at the other ends of the right exhaust duct 84R and the left exhaust duct 84L. Therefore, the space in the front box 16 is utilized efficiently, and the fuel gas leaked into the stack case 14 can be discharged to the outside of the vehicle easily and reliably.

Further, the one end of the right exhaust duct 84R and the one end of the left exhaust duct 84L are indirectly connected to both ends of the stack case 14 in the vehicle width direction. As shown in FIG. 2, in a plan view of the vehicle, the right exhaust duct 84R and the left exhaust duct 84L are inclined to the outside in the vehicle width direction (direction indicated by the arrow BR or the direction indicated by the arrow BL) toward the backside in the traveling direction of the vehicle (direction indicated by the arrow Ab). Therefore, since the right exhaust duct 84R and the left exhaust duct 84L extend obliquely toward the backside of the vehicle, when the fuel cell vehicle 10 travels forward, ventilation for the vehicle can be performed smoothly, thanks to the pressure difference between the right exhaust duct 84R and the left exhaust duct 84L, and the right exhaust port 92R and the left exhaust port 92L.

Further, as shown in FIGS. 3 and 6, upper end positions of the left exhaust port 92L and the right exhaust port 92R are below the lower end position of at least part of the inner wall surfaces of the left exhaust duct 84L and the right exhaust duct 84R. That is, the right exhaust duct 84R and the left exhaust duct 84L partially have a height difference, and includes steps and curves. Thus, it is possible to reliably suppress backflow of rainwater, etc. into the left exhaust duct 84L and the right exhaust duct 84R.

Further, the opening areas of the left exhaust port 92L and the right exhaust port 92R are increased toward the backside in the traveling direction of the vehicle. In the structure, the left exhaust port 92L and the right exhaust port 92R can be provided in the left fender part 86L and the right fender part 86R, close to the front wheels 11F. Therefore, the left exhaust port 92L and the right exhaust port 92R have compact structure suitably.

As shown in FIG. 2, the stack case 14 containing the fuel cell stack 12 may be provided behind the vehicle body 10a. In this case, the left exhaust gas member 88L and the right exhaust gas member 88R can be provided in a left fender part 86Lr and a right fender part 86Rr of the rear wheels 11R.

Further, in the illustrated embodiment, the openings 80a to 80d are provided in the stack case 14, and the exhaust ducts 82a to 82d are connected to the openings 80a to 80d. However, the present invention is not limited in this respect. For example, only the openings 80a, 80b may be provided, and the exhaust ducts 82a, 82b may be connected to the openings 80a, 80b.

Further, in the illustrated embodiment, though the first end plate 26a and the second end plate 26b are used as part of the stack case 14, the present invention is not limited in this respect. The fuel cell stack 12 may be placed in an independent rectangular parallelepiped casing.

While the invention has been particularly shown and described with reference to a preferred embodiment, it will be understood that variations and modifications can be effected thereto by those skilled in the art without departing from the scope of the invention as defined by the appended claims.

What is claimed is:

1. A fuel cell vehicle comprising:
a fuel cell stack formed by stacking a plurality of fuel cells configured to generate electrical energy by electrochemical reactions of a fuel gas and an oxygen-containing gas;
a stack case containing the fuel cell stack, the stack case having at least one opening formed on an upper surface thereof;
a vehicle body equipped with the stack case in the vehicle body; and
a duct member disposed in the vehicle body, the duct member having a proximal end and a distal end,
wherein:
the proximal end of the duct member is connected to the at least one opening of the stack case;
the distal end of the duct member is opened to a fender part of the vehicle body, and
the at least one opening and the duct member are configured to discharge the fuel gas from the stack case to an area outside of the fuel cell vehicle.

2. The fuel cell vehicle according to claim 1, wherein the stack case is mounted in a front box formed in front of a dashboard; and
an exhaust port opened to an upper position of the fender part of a front wheel is provided at the distal end of the duct member.

3. The fuel cell vehicle according to claim 1, wherein the duct member extends from the at least one opening of the stack case substantially in a vehicle width direction; and
in a top plan view of the vehicle, the duct member is inclined to the outside in the vehicle width direction, and is also inclined rearwardly in a traveling direction of the vehicle.

4. The fuel cell vehicle according to claim 2, wherein an upper end position of the exhaust port is below a lower end position of at least part of an inner wall surface of the duct member.

5. The fuel cell vehicle according to claim 2, wherein an opening area of the exhaust port is increased toward a backside in a traveling direction of the vehicle.

6. The fuel cell vehicle according to claim 1, wherein a right duct member and a left duct member of duct members are coupled by a bypass duct.

7. The fuel cell vehicle according to claim 1, wherein said at least one opening comprises four openings, and four duct members are connected to the four openings at four corners of the stack case.

8. The fuel cell vehicle according to claim 1, wherein two duct members of the duct members on one side of the stack case in a vehicle width direction are merged and opened to an exhaust port provided on an upper position of the fender part.

9. The fuel cell vehicle according to claim 2, wherein a mesh member is provided on the exhaust port.

10. A fuel cell vehicle comprising:
a fuel cell stack formed by stacking a plurality of fuel cells configured to generate electrical energy by electrochemical reactions of a fuel gas and an oxygen-containing gas;
a stack case containing the fuel cell stack, the stack case having a rectangular upper surface with a respective opening formed therein proximate each of four corner portions thereof;
a vehicle body equipped with the stack case in the vehicle body; and
a pair of duct members disposed in the vehicle body, each of the duct members being formed in a modified Y-shape, having a distal end and a bifurcated proximal end,
wherein:
  the bifurcated proximal end of each of the duct members is connected to two of the openings of the stack case;
  the distal end of the each of the duct members is opened to a fender part of the vehicle body; and
  the duct members are configured to discharge the fuel gas from the stack case to an area outside of the fuel cell vehicle.

11. The fuel cell vehicle according to claim 10, wherein the stack case is mounted in a front box formed in front of a dashboard; and
an exhaust port opened to an upper position of the fender part of a front wheel is provided at the distal end of the duct member.

12. The fuel cell vehicle according to claim 10, wherein each of the duct members extends from the stack case substantially in a vehicle width direction; and
  in a top plan view of the vehicle, each duct member is inclined to the outside in the vehicle width direction, and is also inclined rearwardly in a traveling direction of the vehicle.

13. The fuel cell vehicle according to claim 11, wherein an upper end position of each exhaust port is below a lower end position of at least part of an inner wall surface of the corresponding duct member.

14. The fuel cell vehicle according to claim 11, wherein an opening area of the exhaust port is increased toward a backside in a traveling direction of the vehicle.

15. The fuel cell vehicle according to claim 10, wherein a right duct member and a left duct member of the duct members are coupled by a bypass duct.

16. The fuel cell vehicle according to claim 10, wherein two portions of the duct members on each side of the stack case in a vehicle width direction are merged and opened to an exhaust port provided on an upper position of the fender part.

17. The fuel cell vehicle according to claim 11, wherein a mesh member is provided on the exhaust port.

* * * * *